United States Patent [19]

Marwin

[11] Patent Number: 5,280,162
[45] Date of Patent: Jan. 18, 1994

[54] OBJECT SENSING SYSTEM FOR BAR CODE LASER SCANNERS

[75] Inventor: Gregg A. Marwin, Douglaston, N.Y.

[73] Assignee: Symbol Technologies, Inc., Bohemia, N.Y.

[21] Appl. No.: 82,527

[22] Filed: Jun. 25, 1993

Related U.S. Application Data

[63] Continuation of Ser. No. 812,539, Dec. 23, 1991, abandoned.

[51] Int. Cl.$^5$ .............................................. G06K 7/10
[52] U.S. Cl. .................... 235/462; 235/455; 250/561; 250/566; 250/236
[58] Field of Search ................ 235/455, 462; 250/561, 250/566, 235, 236

[56] References Cited

U.S. PATENT DOCUMENTS

| | | | |
|---|---|---|---|
| 3,925,639 | 12/1975 | Hester | 250/561 |
| 4,101,072 | 7/1978 | Weaver et al. | 235/455 |
| 4,240,064 | 12/1980 | Dev Choudhury | 235/462 |
| 4,356,389 | 10/1982 | Quirey et al. | 235/455 |
| 4,369,361 | 1/1983 | Swartz et al. | 235/470 |
| 4,387,297 | 6/1983 | Swartz et al. | 235/462 |
| 4,496,831 | 1/1985 | Swartz et al. | 235/472 |
| 4,521,678 | 6/1985 | Winter | 235/472 |
| 4,575,625 | 3/1986 | Knowles | 235/467 |
| 4,593,186 | 6/1986 | Swartz et al. | 235/472 |
| 4,639,606 | 1/1987 | Boles et al. | 235/455 |
| 4,694,182 | 9/1987 | Howard | 250/566 |
| 4,766,297 | 8/1988 | McMillan | 235/455 |
| 5,019,698 | 5/1991 | Eastman | 235/462 |
| 5,059,777 | 10/1991 | Wittensoldner et al. | 235/470 |
| 5,237,161 | 8/1993 | Grodevant | 235/462 |

FOREIGN PATENT DOCUMENTS

| | | |
|---|---|---|
| 424097 | 4/1991 | European Pat. Off. . |
| 424976 | 5/1991 | European Pat. Off. . |
| 3129587 | 6/1991 | Japan ................... 235/455 |

*Primary Examiner*—John Shepperd

[57] ABSTRACT

In a bar code laser scanning system operable in a continuous scan mode and a sleep mode, an object sensing circuit for automatically switching said laser scanning system from the sleep mode to the scan mode is provided to help extend the operational lifetimes of the system components such as the laser diode and the scanning motors. When in the sleep mode, pulsed light is received and processed to generate a steady state voltage signal. Derived from the steady state voltage signal is a positive threshold voltage signal and a negative threshold voltage signal each having a magnitude respectively greater than and less than that of the steady state voltage level. The steady state, positive threshold and negative threshold voltage signals are input to a comparator means which detects when an object is placed in the scanning field of the laser scanning system. Object detection occurs when the steady state voltage increases above the positive threshold voltage signal or decreases below the negative threshold voltage signal depending upon the object's reflectivity. When an object is detected, a trigger signal is provided to direct the laser system to switch back into the scan mode without interrupting the normal scanning process.

92 Claims, 6 Drawing Sheets

OBJECT SENSING SYSTEM FOR BAR CODE LASER SCANNERS

REFERENCE TO RELATED APPLICATIONS

This application is a continuation of U.S. patent application Ser. No. 07/812,539, filed Dec. 23, 1991, now abandoned.

BACKGROUND OF THE INVENTION

1. Field of the Invention

The present invention relates to laser scanning systems for reading and decoding bar code symbols. Particularly, it relates to an object sensing circuit that (i) detects when an object has been introduced into the scan field of the laser scanner and (ii) automatically converts the laser scanning system from a sleep or object sensing mode of operation to a continuous or scan mode of operation when an object has been detected.

2. Discussion of Prior Art

Various optical readers and optical scanning systems have been developed heretofore for reading bar code symbols appearing on a label or on the surface of an article. The bar code symbol itself is a coded pattern of indicia comprised of a series of bars of various widths spaced apart from one another to bound spaces of various widths, the bars and spaces having different light reflecting characteristics. The readers and scanning systems electro-optically transform the graphic indicia into electrical signals, which are decoded into alphanumerical characters that are intended to be descriptive of the article or some characteristic thereof. Such characters are typically represented in digital form and utilized as an input to a data processing system for applications in point-of-sale processing, inventory control, and the like. Scanning systems of this general type have been disclosed, for example, in U.S. Pat. Nos. 4,251,798, 4,369,361, 4,387,297, 4,409,470, 4,760,248, and 4,896,026, all of which have been assigned to the same assignee as the instant application.

Bar code symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include UPC/EAN, Code 39, Code 128, PDF417 Codabar, and Interleaved 2 of 5.

For the purpose of our discussion, characters recognized and defined by a symbology shall be referred to as legitimate characters, while characters not recognized and defined by that symbology are referred to as illegitimate characters. Thus, an arrangement of elements not decodable by a given symbology corresponds to an illegitimate character(s) for that symbology.

In order to increase the amount of data that can be represented or stored on a given amount of surface area, several new bar code symbologies have recently been developed. One of these new code standards, Code 49, introduces a "two-dimensional" concept by stacking rows of characters vertically instead of extending the bars horizontally. That is, there are several rows of bar and space patterns, instead of only one row. The structure of Code 49 is described in U.S. Pat. No. 4,794,239, which is hereby incorporated by reference.

A one-dimensional single-line scan, as ordinarily provided by hand-held readers, has disadvantages in reading these two dimensional bar codes; that is, the reader must be aimed at each row, individually. Likewise, the multiple-scan-line readers produce a number of scan lines at an angle to one another so these are not suitable for recognizing a Code 49 type of two-dimensional symbols.

In the scanning systems known in the art, the light beams are directed by a lens or similar optical components along a light path toward a target that includes a bar code symbol on the surface. The scanner functions by repetitively scanning the light beam in a line or series of lines across the symbol. The scanning component may either sweep the beam spot across the symbol and trace a scan line across and past the symbol, or scan the field of view of the scanner, or do both.

Scanning systems also include a sensor or photodetector which functions to detect light reflected from the symbol. The photodetector is therefore positioned in the scanner or in an optical path in which it has a field of view which extends across and slightly past the symbol A portion of the reflected light which is reflected off the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces.

Such a signal is then decoded according to the specific symbology into a binary representation of the data encoded in the symbol, and to the alphanumeric characters so represented.

Laser scanners are not the only type of optical instrument capable of reading bar code symbols. Another type of bar code reader is one which incorporates detectors based upon charge coupled device (CCD) technology. In such readers size of the detector is larger than or substantially the same as the symbol to be read. The entire symbol is flooded with light from the reader, and each CCD cell is sequentially read out to determine the presence of a bar or a space. Such readers are lightweight and easy to use, but require substantially direct contact or placement of the reader on the symbol to enable the symbol to properly read. Such physical contact of the reader with the symbol is a preferred mode of operation for some applications, or as a matter of personal preference by the user.

There presently exists various types of fixed mount omnidirectional laser scanners for bar code reading applications. These scanners typically use one or more motor/mirror assemblies to generate a scan pattern. The light source used to scan bar codes is usually a semiconductor visible laser diode. For a typical omnidirectional laser scanner, the scan pattern is designed such that the bar code may be scanned in any orientation in a plane with respect to the scan pattern. This obviates the need for the user of the scanner to carefully align the bar code symbol with respect to the scan pattern as one would have to do for single line laser scanners, whether fixed mount or hand held.

Fixed mount omnidirectional scanners are often operated in a continuous ON mode. In this mode, items having bar codes may be rapidly scanned with no need for the user to carefully align the bar code symbol nor to initiate the scanning process by turning on the scanner in any way. A key disadvantage of continuous mode operation is that the key internal components of the laser scanner, such as the visible laser diode and the scan motor, have limited operational lifetimes and their degradation is accelerated by continuous operation. For instance, the reflective facets which define the laser cavity tend to degrade in reflectivity over time resulting in the gradual reduction of effective laser output power. Also, the various motors used as scanning elements all comprise mechanical parts having finite lifetimes. Other factors that may degrade motor lifetime are high speeds, unbalanced motor shaft loads, and high temperatures associated with constant on or high duty-cycle operation.

Because of the limited lifetime associated with the key elements of the laser scanner, it is undesirable to have the scanner remain on during extended periods of non-use. Thus, to extend the overall scanner lifetime, the scanner may be shut down if it is not used for a predetermined length of time. The shutting down process may be implemented in hardware or software. In prior art laser scanners, this shutting off process may have required the user to manually restart the scanner, possibly by toggling an external switch on the scanner or controller. This is not desirable because time is wasted during the power-up process and especially because that process is not transparent to the user.

In view of the above-mentioned disadvantages associated with an omni-directional laser scanner having only a continuous ON and OFF mode of operation, a system that provides a way for the laser scanner to operate in a dormant state or "sleep" mode of operation, when not in use, would be highly desirable. Such a sleep mode would permit the laser scanner components such as the visible laser diode to remain OFF, and the motor(s) to operate at a fraction of the nominal scanning speed, thus helping to reduce overall power consumption and significantly extend the lifetimes of these components. Furthermore, a system that can rapidly convert from a sleep mode to a continuous ON mode of operation in a way that is virtually transparent to the user would also be advantageous. It is accordingly an object of the present invention to fulfill these needs by providing an object sensing system that automatically converts the laser scanner from a sleep mode to a continuous mode of operation when an object is introduced in the scanning field. Such an object sensing system provides circuitry that detects when an object is placed in the scanning field, such as when a user attempts to read a bar-coded item. Once detected, the object sensing system automatically "wakes up" to scan and decode the symbol. Thus the present invention enables the user of bar code scanners to conserve the useful lifetime of the critical scanner components including the laser diode and scan motors without sacrificing the ease of use or scanner throughput.

SUMMARY OF THE INVENTION

The present invention is directed to an object sensing system that provides object sensor circuitry for detecting when any object is introduced into the scanning field of a fixed mount bar code laser scanning device. This circuitry operates to detect a change in the received signal level of the reflected light from a pulsed illumination source that operates when the laser scanning system is in the sleep mode of operation. When in the sleep mode, the object sensor circuitry generates a steady state voltage signal from the reflected light of the pulsed illumination source. Derived from the steady state voltage signal are two threshold voltage signals; a positive threshold signal having a magnitude a predetermined percentage greater than that of the steady state signal and a negative threshold signal having a magnitude a predetermined percentage less than that of the steady state signal. When an object is placed in the scan field, the steady state voltage signal level may either increase or decrease depending upon the distance, spatial orientation, and relative contrast between the object and the background surface. The object sensor circuitry continuously monitors and compares the steady state voltage signal with the positive and negative threshold voltage signals. When the steady-state voltage signal increases above or decreases below the positive or negative threshold voltage signal respectively, the object sensor circuitry generates a trigger signal that is received by the laser scanning system's microprocessor. Upon receipt of the trigger signal, the microprocessor directs the laser scanning system to operate in its continuous scanning mode, i.e., the laser scanning diode operates at full power and the scan motors operate at their full speed. Thus, from the viewpoint of the user, the laser scanner is again ready to scan, read, and decode the bar code symbol of the particular object in a negligible amount of time.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENT

The Laser Scanner System

Figure 1:
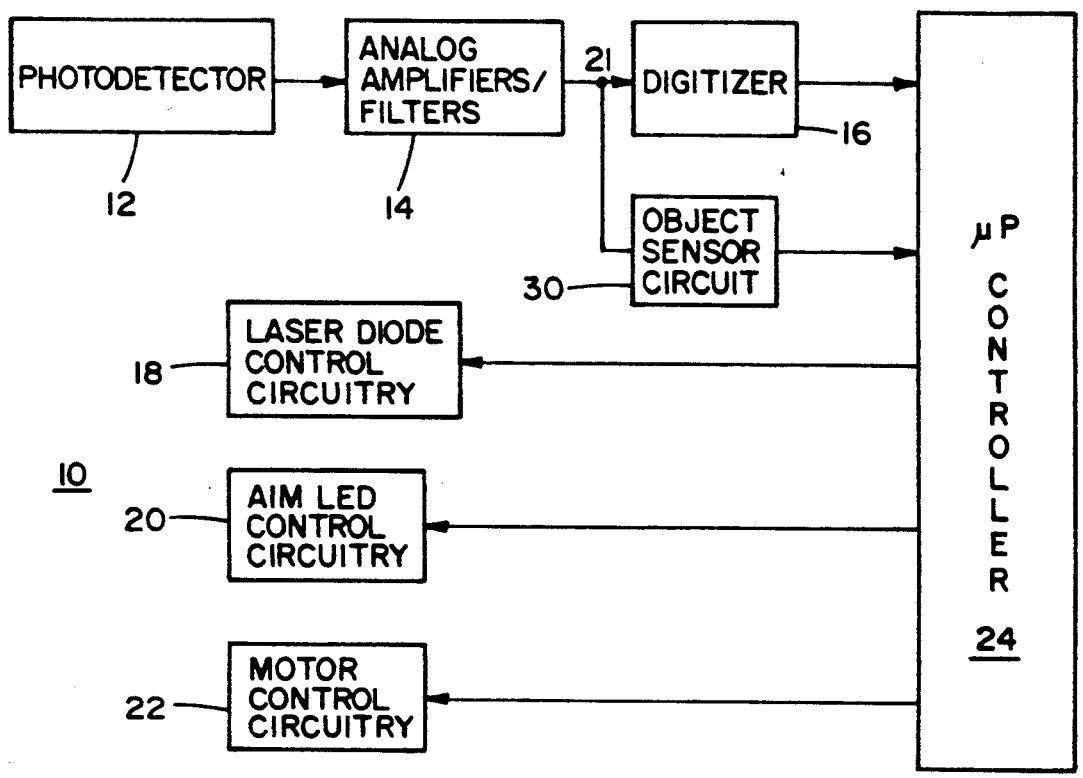
FIG. 1 is a block diagram of a laser scanner system that incorporates the present invention.

A block diagram of the laser scanner system 10 that incorporates the object sensing circuit 30 of the present invention is shown in FIG. 1. The scanner system 10, which is illustrative of the SL9000 laser scanner developed and manufactured by Symbol Technologies, Inc. of Bohemia, N.Y. 11716, the assignee of the present invention, is an omnidirectional laser scanner having two rotating motor/mirror assemblies that create a rosette type laser scan pattern 13 such as the one illustrated in FIG. 2. The number of lobes and rate of precession of the scan pattern are determined by the ratio of the two motor speeds. The laser light source is a semiconductor laser diode that generates light having a wavelength of about 680 nm which is near the upper limit of the human eye response. Referring again to FIG. 1, the laser diode control circuitry 18 and motor/mirror control circuitry 22 are controlled by microprocessor 24. Laser scanning system 10 also provides an illumination source such as a light emitting diode for illuminating a portion of the rosette scan pattern 13. The portion of the scan pattern being illuminated appears, in the preferred embodiment, as a bright, stationary spot 15 at the center of the rosette scanning pattern 13 (see FIG. 2). This illuminated spot functions to assist the user in introducing a bar code into the scan pattern when the visibility of the laser scan pattern becomes poor in normal ambient light conditions. Typical ambient light sources include overhead fluorescent and incandescent lamps and filtered sunlight. The light emitting diode will hereinafter be referred to as the AIM LED and the illuminated spot 15 as the AIM LED spot. In the preferred embodiment, the light generated by the AIM LED is focused by an optical convex mirror to form the AIM LED spot 15. In other embodiments, focusing lenses may be used, or, a combination of optical lenses and mirrors. Since the AIM LED is pulsed, microprocessor 24 and AIM LED control circuitry 20 are used to control its duty cycle and frequency. The blinked AIM LED is used as the illumination source for the object sensor circuit 30 and its blinking rate is chosen to be in the pass band of the analog amplifiers/filters 14. Note that the blinking rate is chosen to be much higher than the 120 Hz frequency of most ambient light sources.

Figure 2:
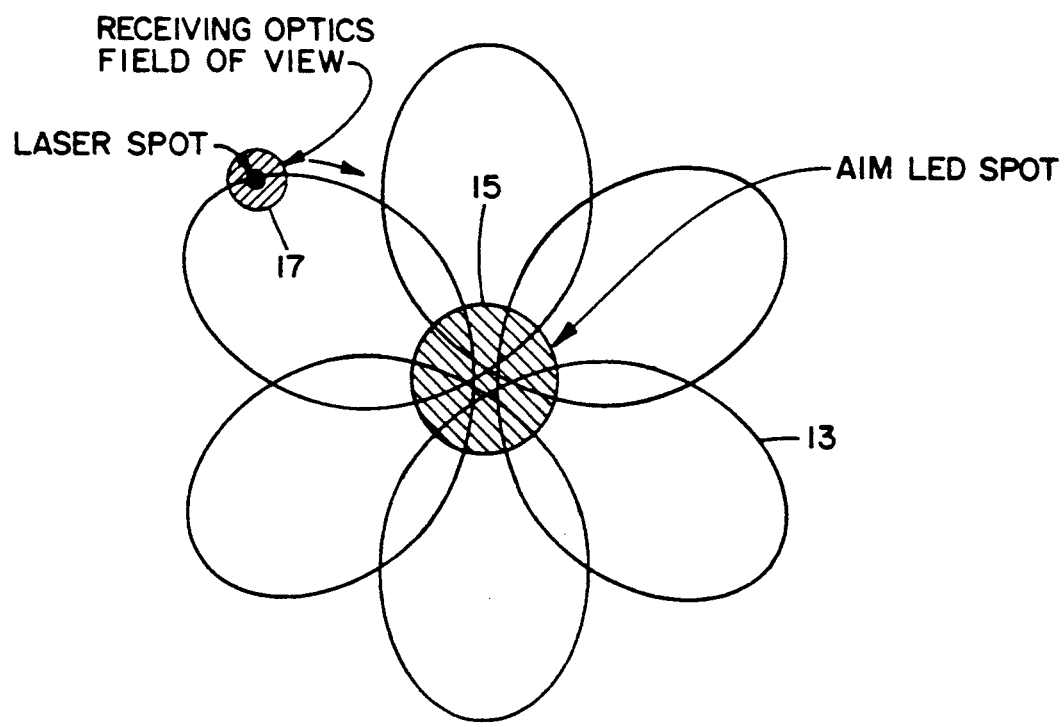
FIG. 2 shows the laser spot tracing a rosette pattern, the moving optical field of view about the laser spot, and the stationary AIM spot used as an illumination source for the object sensor system.

The receiving optics of scanning system 10 are retroreflective with an optical field of view limited to a small area about the laser spot FIG. 2 shows the field of view 17 following the laser spot about the rosette pattern 13 defining a scan field. The small field of view increases the system signal to noise ratio by making the system less sensitive to disturbing ambient light sources. As shown in FIG. 1, photodetector 12 and analog amplifier/filters 14 comprise a part of the light receiving circuitry. The analog amplifier/filter 14 pass band is such that it rejects any noise components at the lower ambient light frequencies. When the laser scanning system 10 is in the scanning mode, laser light is reflected off a bar code and is received by photodetector 12 and amplified and filtered by the analog amplifier/filter circuitry 14. The resulting signal 21 is then digitized by hardware digitizer 16 and subsequently decoded by microprocessor 24 and a bar code decoder (not shown).

Description of Scanning States

Figure 3:
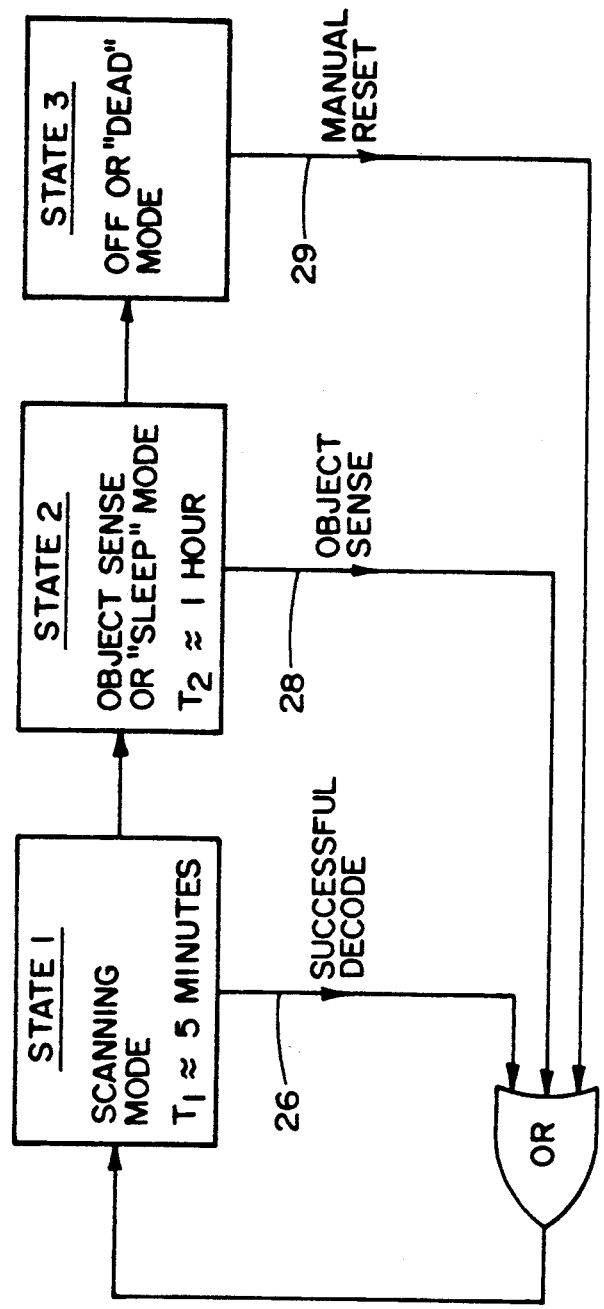
FIG. 3 is a block diagram of the operational modes of the laser scanning system illustrated in FIG. 1.

Laser scanning system 10 operates in three scanning states as illustrated in the diagram of FIG. 3. The scanning states or "modes" are depicted as boxes in FIG. 3. The use of the electronic "or" gate symbol in FIG. 3 is meant to convey that laser scanning system 10 can only operate in one mode at any given time.

In the continuous or scanning mode state, the scanner is completely on and ready to scan bar codes. The motors operate at full speed and the laser operates at full power. The AIM LED is continuously on and operates at 100% duty cycle in the preferred embodiment. A first timer implemented by microprocessor 24 functions to switch the scanner into the object sense or sleep mode if the scanner is unused for a period of time $T_1$. In a preferred embodiment $T_1$ is typically set to five minutes. If a bar code is successfully decoded while in the scanning mode state, a signal 26 is generated which directs the first timer to be reset. Thus the scanner will always remain in the scanning mode state when it is often being used (at least once every five minutes).

In the sleep mode, the laser diode is shut off and the motors operate at a fraction of their scanning speed while keeping the speed ratio constant. The AIM LED is blinked on and off at a frequency of about 20 KHz with a duty cycle of 50% in the preferred embodiment. Since the laser diode is off and the motors run at slower speeds, power consumption is reduced and the lifetime of these components is extended.

If a user tries to scan a bar code while in the sleep mode, the object sensor circuit 30 will detect that an object has been placed in the scan field. When a detection occurs, an object sensor trigger signal 28 is generated and used to direct the microprocessor to switch the laser scanning system back into the scanning mode. It should be mentioned that both object sensing and bar code decoding occur immediately after the object is introduced into the scan field. As will be explained in greater detail below, the object sensor circuit response time is quick enough so that the normal scanning process in not interrupted.

A second timer implemented by microprocessor 24 functions to switch the laser scanner into the OFF or dead mode if no object sensor trigger signal 28 occurs in a time period $T_2$. In the preferred embodiment, $T_2$ is typically set to one hour. In the OFF or dead mode, the microprocessor 24 is directed to turn off all laser scanning system components that have limited lifetimes or have greater power consumption, e.g., the laser diode, motors, AIM LED. In the preferred embodiment, some of the lower power consuming components, such as the photodetector 12, may remain on in the dead mode. Other components that have a long operational lifetime may be left on in the dead mode. The laser scanner 10 usually enters the dead mode only after extended periods of non-use (e.g., one hour or more). To start up the scanner again a manual reset switch (not shown) is pushed to generate a manual reset signal 29. Manual reset signal 29 is coupled to microprocessor 24 which starts up the laser scanner system 10 in the scanning mode.

Object Sensor Circuitry

As previously mentioned, the requirement of the object sensing circuit 30 of the present invention is to detect when any object is introduced into the scanner field. This is accomplished by detecting a change in the received signal level of the reflected light from the pulsed AIM LED illumination source. The functional block diagram of object sensing circuit 30 shown in FIG. 4 and detailed circuit diagram of FIG. 5 illustrate how this is achieved.

When the scanner system 10 is in the sleep mode, the bursts of pulses at the AIM LED blinking frequency are received by the photodetector 12 each time the field of view 17 passes through the stationary AIM LED spot 15. The received signal is the periodic convolution of the moving field of view 17 with the stationary pulsed AIM LED spot 15. After being received by the photodetector, the received signal is then amplified and filtered by amplifier/filter block 14 to obtain signal 21. As can be seen from FIG. 7, the amplitude of signal 21 rises to a maximum when the field of view 17 overlaps the AIM LED spot 15. In the preferred embodiment, the blinking frequency of the AIM LED is much greater than the spatial frequency of the field of view. Referring back to FIG. 5, amplifier U1 adds gain to properly scale the received signal 21.

Figure 7:
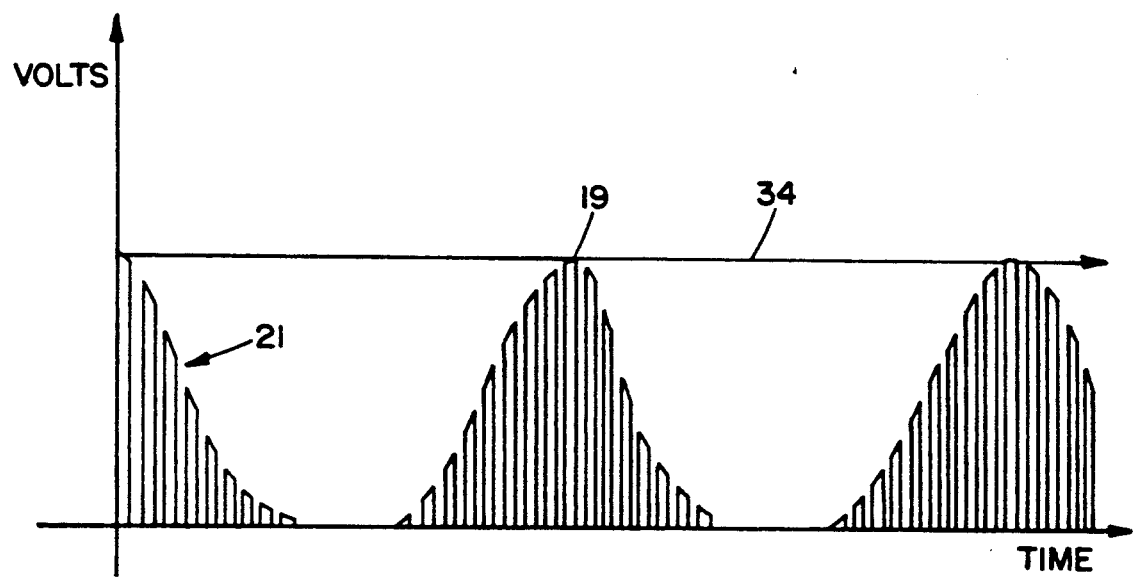
FIG. 7 illustrates typical waveforms of the received signal representing reflecting light and the steady state background signal after peak detection.

The received signal 21 is used to generate a steady state background signal 34 by passing signal 21 through the peak detector/low pass filter combination 32 comprising electronic components CR1, R1, and C1 in the preferred embodiment. The components of peak detector 32 are chosen so that its time constant is large thus keeping the ripple 19 of steady state signal 34 to a minimum as FIG. 7 illustrates. Steady state background signal 34 is proportional to the strength of the light reflected off of a background surface in the laser scan field. A change in the background signal 34 will occur when an object is placed in the path of the AIM LED spot 15 or the scan field. This change in signal 34 is detected by object sensing circuit 30 in the manner described below:

A positive threshold signal 35 and negative threshold signal 37 are derived from the steady state background level, i.e., steady state signal 34. The circuitry used to derive the positive threshold signal 35 is shown as block 36 in FIGS. 4 and 5 and includes components R2, R4, C2, U2, R6, and R7. The values of the components are chosen so that the loading on the peak detector 32 is negligible and that the circuit time constant is greater than that of the peak detector/LPF combination 32. This ensures that the positive threshold signal 35 has a slow charging time with respect to steady state background signal 34. Thus, when steady state signal 34 changes in response to a detected object, the positive threshold voltage signal 35 derived therefrom does not instantaneously change. When operating in the sleep mode, the positive threshold signal 35 is about 5% greater in value than the steady state signal 34.

Figure 4:
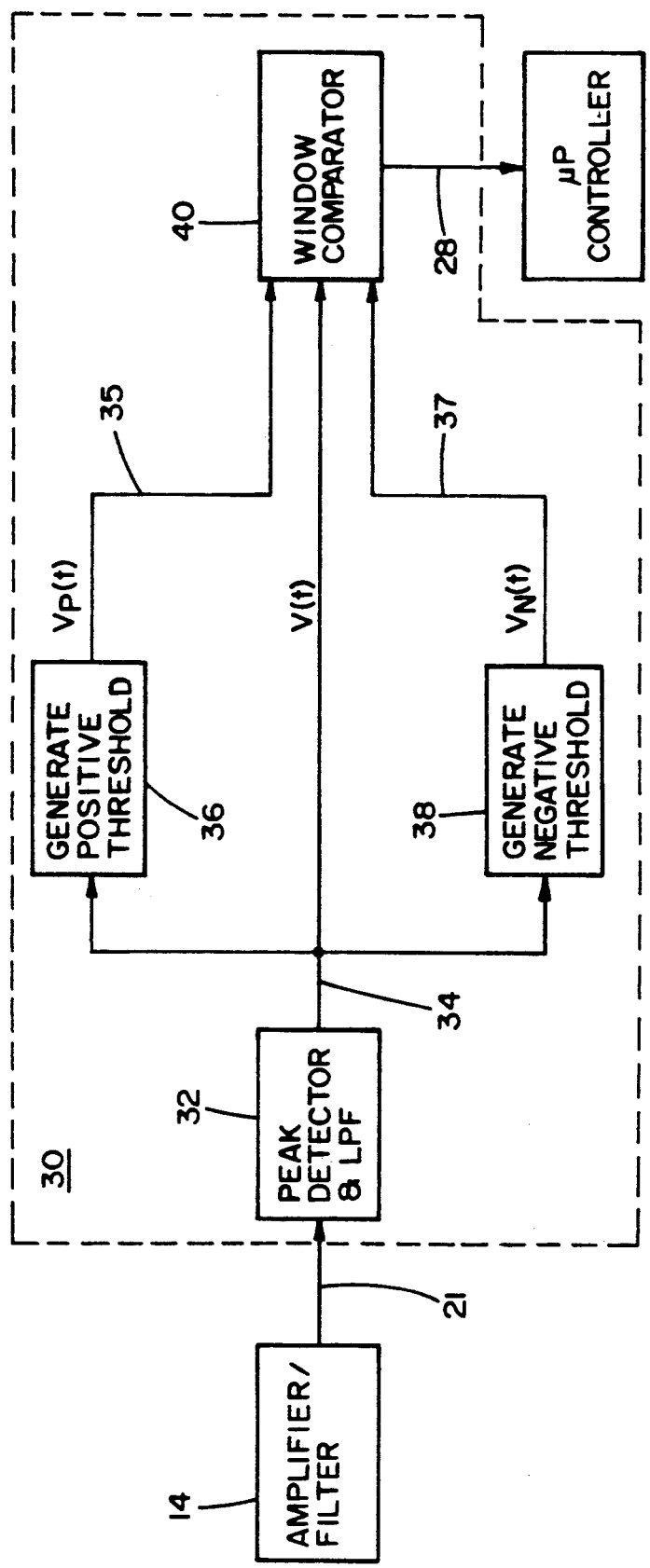
FIG. 4 is a block diagram of the object sensor circuit.
Figure 5:
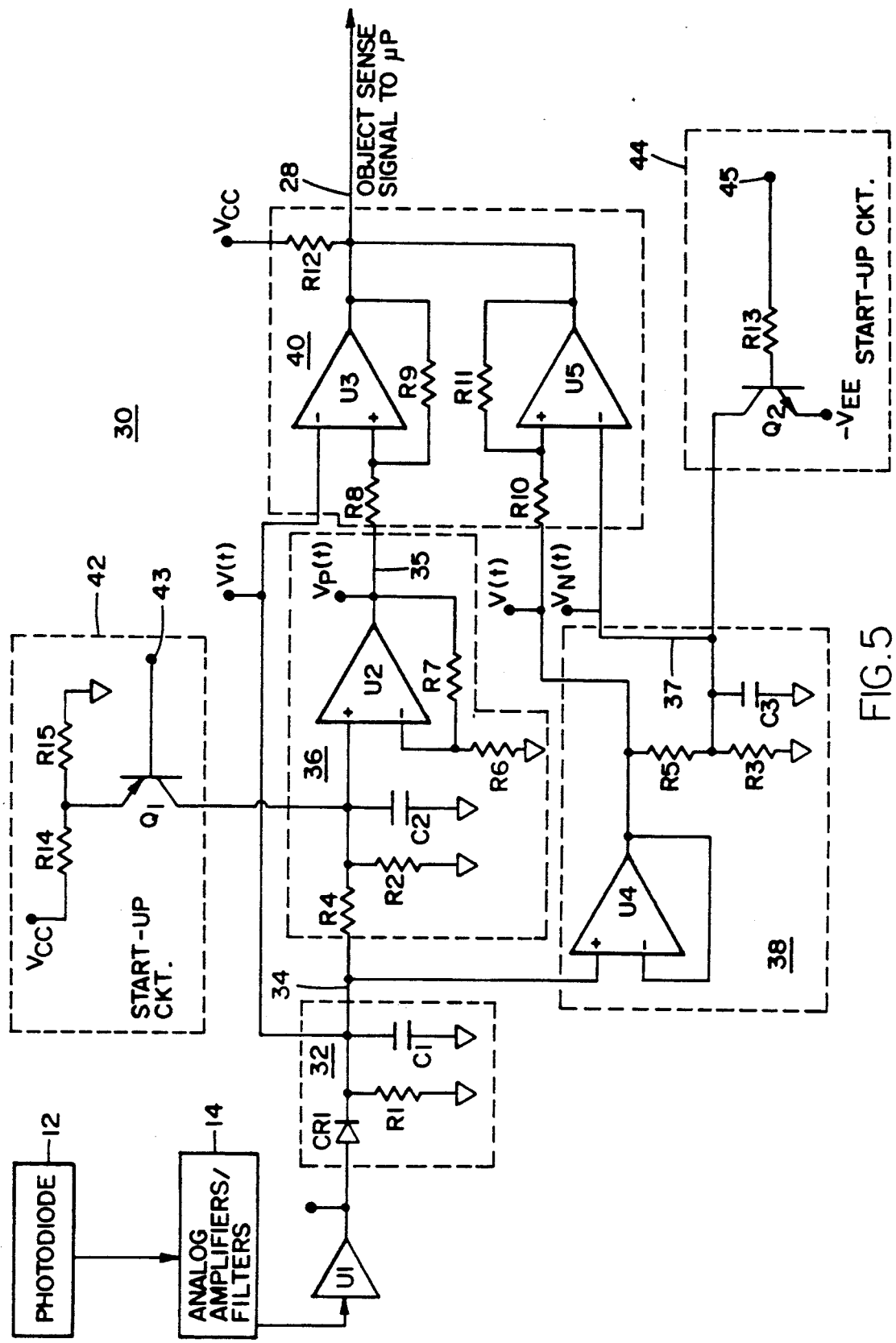
FIG. 5 is a schematic diagram of the object sensor circuit.

The circuitry used to derive the negative threshold signal 37 is shown as block 38 in FIGS. 4 and 5 and includes components U4, R5, R3, and C3. Amplifier U4 acts as a buffer to prevent loading of the peak detector 32. The values of the components are chosen so that the circuit time constant is greater than that of the peak detector/LPF combination 32. This ensures that the negative threshold signal 37 has a slow discharge time with respect to the steady state background signal 34. Thus, when steady state signal 34 changes in response to a detected object, the negative threshold voltage signal 37 derived therefrom does not instantaneously change. When operating in the sleep mode, the negative threshold signal 37 value is about 5% less than that of steady state signal 34. It should be mentioned that both positive and negative threshold signal magnitudes could be changed to suit a particular application. For example, it may be desirable to raise the threshold magnitudes in a noisy environment to thus eliminate false triggers due to the unwanted noise.

The steady state background signal 34 and positive and negative threshold signals 35 and 37 are input to a window comparator 40 consisting of comparators U3, U5, pull-up resistor R12 and resistor pairs R8, R9, and R10, R11 which are used to add hysteresis to the comparators U3 and U5, respectively. The output of window comparator 40, i.e., object sensor trigger signal 28, is normally at a high voltage (or a logic "1") in the sleep mode and drops to a low voltage (or a logic "φ") when an object is detected by object sensor circuit 30.

Figure 6A:
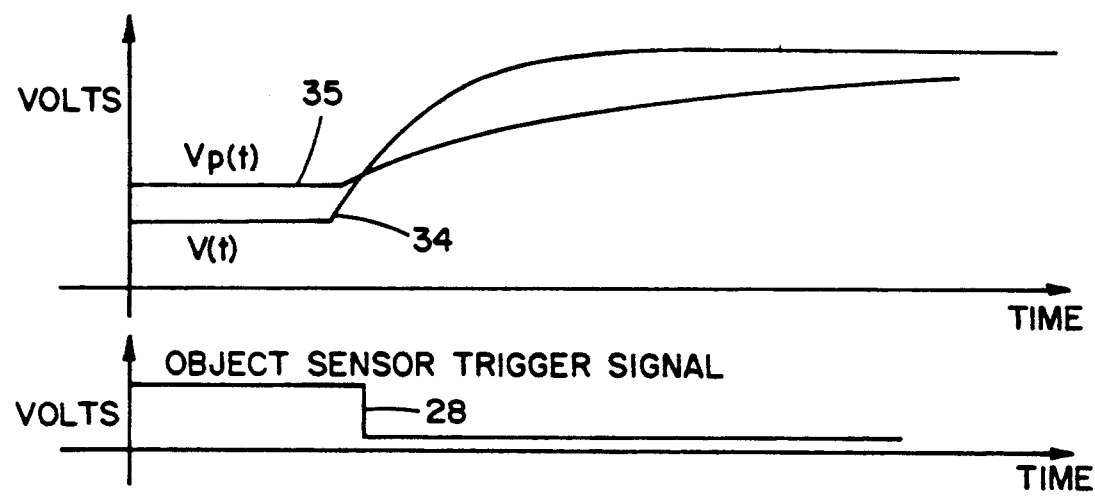
FIGS. 6(a) and (b) show typical object sensor detection waveforms with FIG. 6(a) illustrating the voltage signal produced when the object placed in the scanning field has greater reflectivity than the background level and FIG. 6(b) illustrating the voltage signal produced when the object has reflectivity less than that of the background level.
Figure 6B:
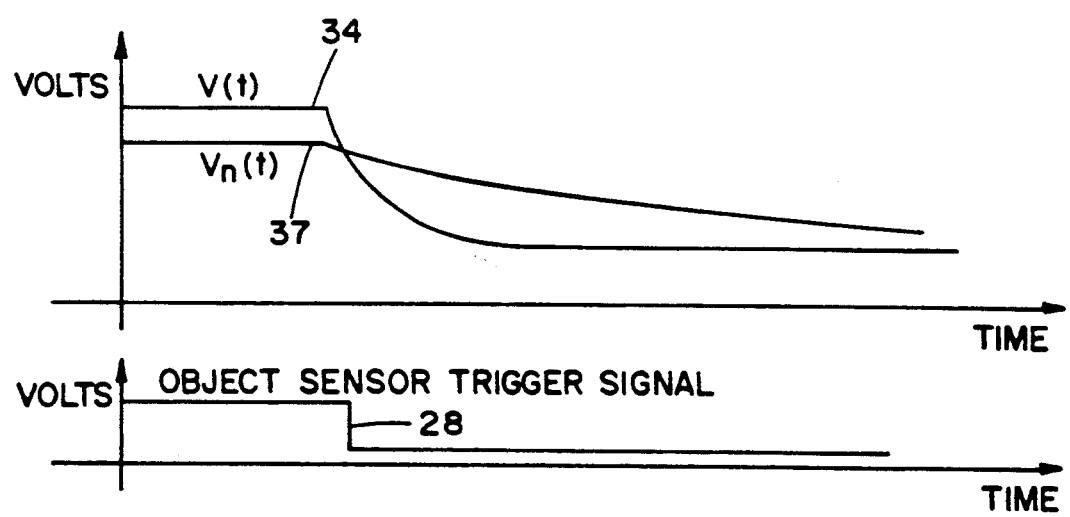

Typical detection waveforms are shown in FIGS. 6(a) and 6(b). FIG. 6(a) shows the detection waveforms when an object with a reflectivity greater than that of the illuminated background surface is placed in the scan field of view 17. As can be seen, the steady state background signal 34 increases above the positive threshold voltage signal 35. At the point when the positive threshold is crossed, trigger signal 28 goes low. FIG. 6(b) shows the detection waveforms when an object with a reflectivity less than that of the illuminated background surface is placed in the scan field 17. As can be seen, the steady state background signal 34 decreases below the negative threshold voltage signal 37. At the point when the negative threshold is crossed, trigger signal 28 goes low. Trigger signal 28 is sent to microprocessor 24 which detects the change, and instantaneously responds by switching the laser scanning system back to the scanning mode.

Start-Up Circuits

When the laser scanning system 10 is in the scanning mode, the laser is operating at full power. In this mode, it is not generally possible to know what the amplitude or frequency content of the analog signal 21 representing the received reflected light will be. This is because they are dependent upon the background surface in scan field 17. Therefore, there is a need to prevent the undesirable event of false triggering when laser scanner system 10 switches from scanning mode to sleep mode. To accomplish this, start-up circuits 42 and 44 as shown in FIG. 5, are connected at the positive and negative threshold generating circuits 36 and 38, respectively. These circuits function to prevent false object sensor triggering when the laser scanner system 10 switches from the scanning mode to the sleep mode after time period $T_1$. Start-up circuit 42 comprises transistor Q1 coupled to the positive voltage power supply line via voltage divider network comprising resistors R14 and R15. The positive voltage power supply line is labelled as $V_{cc}$ in FIG. 5 and is generally about +12.0 volts dc. When the scanner system 10 is in the scanning mode, a signal is present at terminal 43 of transistor Q1 that keeps Q1 turned on, so that the positive threshold voltage signal 35 is pinned at voltage $V_{cc}$. Upon switching from the scanning mode to sleep mode, the microprocessor sends a signal to the base terminal 43 of transistor Q1 which turns Q1 off. When this is done, the positive threshold voltage signal 35 discharges down to its sleep mode steady state level.

Figure 8:
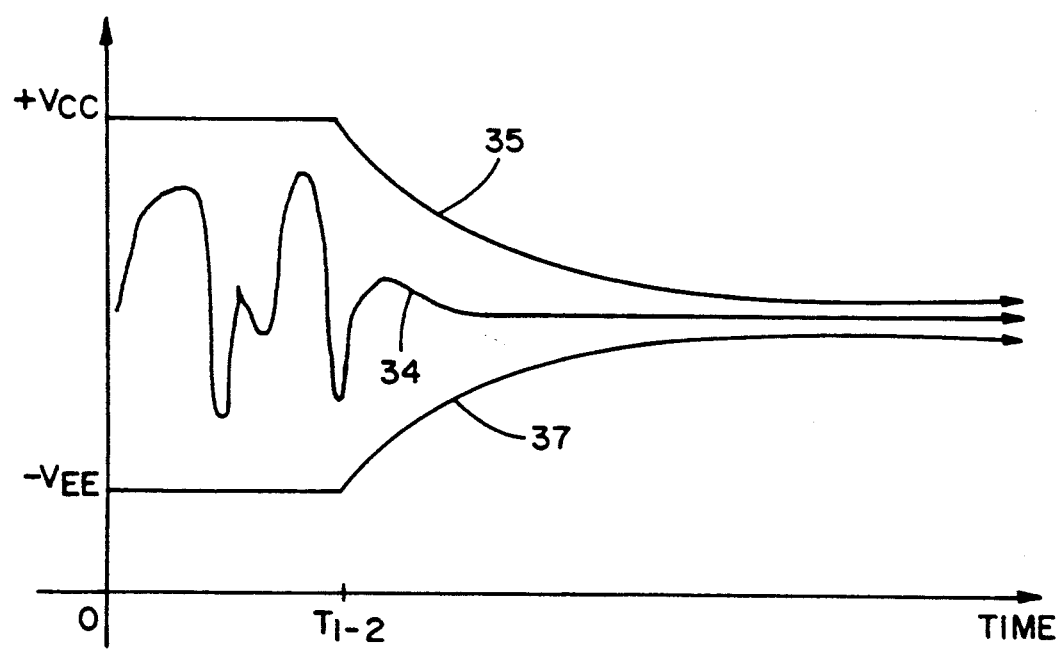
FIG. 8 illustrates the typical positive and negative threshold voltage waveforms during and after transition from scanning mode to sleep mode.

Similarly, start-up circuit 44 comprises transistor $Q_2$ coupled to the negative voltage power supply line labelled $-V_{ee}$ in FIG. 5. The voltage at $-V_{ee}$ is generally about $-12.0$ volts dc. When the scanner system 10 is in the scanning mode, a signal is present at terminal 45 of transistor Q2 that keeps transistor Q2 turned on, so that the negative threshold voltage signal 37 is pinned at voltage $-V_{ee}$. Upon switching from the scanning mode to the sleep mode, the microprocessor sends a signal to the base terminal 45 of transistor Q2 which turns Q2 off. Once this is done, the negative threshold voltage signal 37 discharges to its sleep mode steady state level. FIG. 8 illustrates the typical positive and negative threshold waveforms 35 and 37 as the scanner system switches from scanning mode to sleep mode. The time period labelled $T_{1-2}$ is the time at which the scanner system undergoes the transition from scanner mode to sleep mode.

Although the present invention has been described with respect to linear or single bar codes, it is not limited to such embodiments, but may also be applicable to more complex scanning patterns and to stacked or two-dimensional bar codes such as Code 49 and similar symbologies. It is conceivable that the method of the present invention may also find application for use with various machine vision applications in which information is derived from other types of indicia such as characters or from the surface characteristics of the article being scanned.

In all of the various embodiments, the elements of the scanner may be assembled into a very compact package that allows the scanner to be fabricated as a single printed circuit board of integral module. Such a module can interchangeably be used as the laser scanning element for a variety of different types of data acquisition systems. For example, the module may be alternately used in a hand-held scanner, a table top scanner attached to a flexible arm or mounting extending over the surface of the table or attached to the underside of the table top, or mounted as a subcomponent or subassembly or a more sophisticated data acquisition system.

The module would advantageously comprise a laser/optics subassembly mounted on a support, a scanning element such as a rotating or reciprocating mirror, and a photodetector component. Control or data lines associated with such components may be connected to an electrical connector mounted on the edge or external surface of the module to enable the module to be electrically connected to a mating connector associated with other elements of data acquisition system.

An individual module may have specific scanning or decoding characteristics associated with it, e.g. operability at a certain working distance, or operability with a specific symbology or printing density. The characteristics may also be defined through the manual setting of control switches associated with the module. The user may also adapt the data acquisition system to scan different types of articles or the system may be adapted for different applications by interchanging modules on the data acquisition system through the use of the simple electrical connector.

The scanning module described above may also be implemented within a self-contained data acquisition system including one or more such components as keyboard, display, data storage, application software, and data bases. Such a system may also include a communications interface to permit the data acquisition system to communicate with other components of a local area network or with the telephone exchange network, either through a modem or an ISDN interface, or by low power radio broadcast from the portable terminal to a stationary receiver.

It will be understood that each of the features described above, or two or more together, may find a useful application in other types of scanners and bar code readers differing from the types described above.

While the invention has been particularly shown and described with respect to preferred embodiments thereof, it will be understood by those skilled in the art that the foregoing and other changes in form and details may be made therein without departing from the spirit and scope of the invention, which should be limited only by the scope of the appended claims.

I claim:

1. A laser scanning system having a scan mode of operation, a sleep mode of operation, and means for automatically switching from said sleep mode to said scan mode, said laser scanning system comprising:
   means for generating light over a scanning field;
   means for receiving light reflected from a surface or object in said scanning field;
   peak detector means connected to said receiving means for generating a steady state voltage signal proportional to the strength of the reflected light received when said laser system operates in said sleep mode;
   a first threshold voltage generating means for receiving said steady state signal and generating therefrom a positive threshold voltage signal having a magnitude greater than that of said steady state voltage signal;
   a second threshold voltage generating means for receiving said steady state signal and generating therefrom a negative threshold voltage signal having a magnitude less than that of said steady state voltage signal;
   comparator means for receiving said steady state voltage signal and said positive and negative threshold voltage signals and for detecting a change in said steady state voltage signal level when a reflective object is placed in said scanning field, said change occurring when said steady state voltage signal increases to a level above that of said positive threshold voltage signal or decreases to a level below that of said negative threshold voltage signal depending upon the reflectivity of said object, said comparator means providing an output signal in response to said change; and
   processor means responsive to said output signal for switching said laser scanning system from said sleep mode of operation to said scan mode.

2. A laser scanning system as recited in claim 1, wherein said processor means includes a first timing means for automatically switching said system from said scan mode to said sleep mode when there has been no object introduced into said scan field for a predetermined length of time.

3. A laser scanning system as recited in claim 2 wherein said means for generating light includes a first light source means for generating laser light over a pattern defining said scanning field and a second light source means for illuminating a portion of said scanning field.

4. A laser scanning system as recited in claim 3 wherein said first light source means includes a laser diode.

5. A laser scanning system as recited in claim 3 wherein said processor means includes means for operating said first light source means at full power when said laser scanning system is in said scan mode.

6. A laser scanning system as recited in claim 3 wherein said processor means includes means for turning off said first light source means when said system switches to said sleep mode.

7. A laser scanning system according to claim 3 wherein said second light source means includes a pulsed light emitting diode.

8. A laser scanning system as recited in claim 7 wherein said processor means includes means for operating said light emitting diode at or substantially near full duty cycle when said system is in said scan mode.

9. A laser scanning system as recited in claim 8 wherein said processor means includes means for operating said pulsed light emitting diode at a reduced duty cycle when said system switches to said sleep mode.

10. A laser scanning system as recited in claim 2 further including a positive voltage power supply line having a positive power supply voltage.

11. A laser scanning system as recited in claim 10 wherein said object sensing circuit means comprises a first start-up circuit means for coupling said first threshold voltage generating means to said positive voltage power supply line to thereby cause said positive threshold voltage signal to attain a level at or substantially near said positive power supply voltage when said laser scanning system operates in a continuous scan mode.

12. A laser scanning system as recited in claim 10 wherein said first start-up circuit means maintains said positive threshold voltage signal at or substantially near said positive power supply voltage during the time said system switches from said scan mode to said sleep mode.

13. A laser scanning system as recited in claim 2 further including a negative voltage power supply line having a negative power supply voltage.

14. A laser scanning system as recited in claim 13 wherein said object sensing system additionally comprises a second start-up circuit means for coupling said second threshold voltage generating means to said negative voltage power supply line to thereby cause said negative threshold voltage signal to attain level at or substantially near said negative power supply voltage when said laser scanning system operates in a scan mode.

15. A laser scanning system as recited in claim 14 wherein said second start-up circuit means maintains said negative threshold voltage signal at or substantially near said negative power supply voltage during the time said system switches from said scan mode to said sleep mode.

16. A laser scanning system as recited in claim 1, wherein said processor means further includes a second timing means for automatically switching said system from said sleep mode of operation to an off mode when no object has been placed in said scanning field for a predetermined length of time.

17. The laser scanning system as recited in claim 1, wherein said receiving means includes photodiode means for converting reflected light into a periodic voltage signal.

18. A method for automatically switching a laser scanning system from a sleep mode of operation to a scan mode of operation, said laser scanning system having a means for generating light over a scanning field and a means for receiving light reflected off an object or surface in said scanning field, said method comprising the steps of:
a) generating a steady state voltage signal having a value proportional to the strength of reflected light received off a background surface or object when said system is in said sleep mode of operation;
b) generating positive and negative threshold voltage signals having predetermined voltage levels respectively greater than and less than that of said steady-state voltage signal;
c) detecting when an object is placed in said scanning field including the step of determining when said steady state voltage signal increases to a level above that of said positive threshold voltage signal or decreases to a level below that of said negative threshold voltage signal depending upon the object's reflectivity, and including the step of generating an output signal in response thereto; and
d) switching said laser scanning system from said sleep mode into said scan mode upon receipt of said output signal.

19. The method according to claim 18 further including the step of automatically switching said system from said scan mode of operation to said sleep mode of operation when there has been no symbol decode for a predetermined length of time.

20. The method according to claim 19 further including the step of automatically switching said system from said sleep mode of operation to an off mode when no object has been placed in said scanning field for a predetermined length of time.

21. The method according to claim 20 further including the step of reducing the duty cycle of generated light when said system is operating in said sleep mode.

22. The method according to claim 21, wherein said switching step includes the step of preventing said steady-state signal from increasing above said positive threshold voltage signal or decreasing below said negative threshold signal during a system transition from said scan mode to said sleep mode.

23. A scanning system for reading bar code symbols, said systems having a sleep mode of operation and a scanning mode of operation, comprising:
a. a first light source for emitting a light beam over a field of view;
b. second light source for emitting a scanning light beam over said field of view during said scanning mode operation; and
c. a sensor for detecting the variable intensity of the returning portion of the reflected light from said first and said second light sources over the field of view, and for generating a signal when an object is placed in the field of view to switch said system from said sleep mode to said scanning mode of operation.

24. Apparatus for reading bar code symbols or the like on a target comprising:
a. means for generating a first fixed light beam directed towards a target in a field of view;
b. means for receiving reflected light from such target to produce electrical signals corresponding to the reflectivity of the surface of the target;
c. means for processing said electrical signals to detect if an object is moved into or through said field of view; and
d. means for generating a scanning second light beam in response to the presence of an object in the field of view and processing said electrical signals to read a bar code symbol on a surface of such object.

25. Apparatus as defined in claim 24, wherein said first light beam is pulsed at a first predetermined frequency in a first mode of operation and said means for processing said electric signals produces a background signal when no object is present in the field of view, and said first light beam operates continuously in a second mode of operation.

26. Apparatus as defined in claim 24, wherein said means for generating a scanning second light beam includes a laser diode for generating a light beam and a mirror for deflecting the second light beam in a scanning pattern over a bar code symbol.

27. Apparatus as defined in claim 24, wherein said means for generating a first light beam is operated continuously when the means for generating a scanning light beam is producing a scanning second light beam.

28. Apparatus as defined in claim 24, further comprising timing means for deactivating said means for generating a scanning light beam when no object has been introduced into the scan field of view for a predetermined period of time.

29. Apparatus as defined in claim 24, further comprising a second timing means for automatically switching said first light beam from said first mode of operation to an off mode when no object has been placed in said field of view for a predetermined period of time.

30. Apparatus as defined in claim 25, wherein said means for processing said electrical signals includes means for detecting said background signal and the signal produced when an object is placed within the field of view and for producing an output signal indicative when such signals differ, and processor means responsive to said output signal for switching said first light beam from said first mode to said second mode of operation.

31. Apparatus as defined in claim 30, when said means for generating a scanning second light beam is activated in response to said output signal.

32. Apparatus for reading bar code symbols or the like on a target comprising:
 a. means for generating a first light beam pulsed at a first predetermined frequency in a first mode of operation and operated continuously in a second mode of operation, said beam being directed towards a target in a field of view, and for receiving reflected light from such target to produce electrical signals corresponding to the reflectivity of the surface of the target;
 b. means for processing said electrical signals during said first mode of operation to detect if an object is moved into or through said field of view; and
 c. control means for responsive to the presence of an object in the field of view to generate a scanning second light beam to read a bar code symbol on a surface of such object.

33. Apparatus as defined in claim 32, wherein said means for generating a scanning second light beam includes a laser diode for generating a light beam and a mirror for deflecting the second light beam in a scanning pattern over a bar code symbol.

34. Apparatus as defined in claim 32, wherein said means for generating a first light beam is operated continuously when the means for generating a scanning light beam is producing a scanning second light beam.

35. Apparatus as defined in claim 32, further comprising timing means for deactivating said means for generating a scanning light beam when no object has been introduced into the scan field of view for a predetermined period of time.

36. Apparatus as defined in claim 32, further comprising a second timing means for automatically switching said first light beam during a first mode of operation to an off mode when no object has been placed in said field of view for a predetermined period of time.

37. Apparatus as defined in claim 32, wherein said means for processing said electrical signals includes means for detecting said background signal and the signal produced when an object is placed within the field of view and for producing an output signal indicative when such signals differ, and processor means responsive to said output signal for switching said first light beam from said first mode to said second mode of operation.

38. Apparatus as defined in claim 37, when said means for generating a scanning second light beam is activated in response to said output signal.

39. A system for reading bar code symbols or the like on targets, comprising:
 a. illumination means for generating and directing a first fixed light beam in a pulsing object sensor mode toward a field of view to detect the presence of a target within the field of view, and for directing a laser beam in a reading mode to the target for scanning at least one of said light beam and said field of view in a scan pattern across the target; and
 b. detection means for receiving light reflected off the target in the object sensor mode and the reading mode to produce electrical signals corresponding to data represented by the target.

40. A system according to claim 39, wherein the illumination means includes a light emitting diode light source to produce the first light beam.

41. A system according to claim 39, further comprising scanning means which moves the laser beam along a first scan path in the reading mode.

42. Apparatus as defined in claim 39, further comprising first timing means for deactivating said means for detecting a laser beam when no object has been introduced into the scan field of view for a predetermined period of time.

43. Apparatus as defined in claim 42, further comprising second timing means for automatically switching said first light beam during a first mode of operation to an off mode when no object has been placed in said field of view for a predetermined period of time.

44. Apparatus as defined in claim 39, wherein said detection means functions to process the background signal and the signal produced when an object is placed within the field of view to produce an output signal when such signals differ, further comprising means responsive to said output signal for switching said first light beam from a pulsing mode to a continuous mode of operation.

45. Apparatus as defined in claim 44, when said means for directing a laser beam is activated in response to said output signal.

46. Apparatus for reading bar code symbol or the like comprising:
 a. optical sensor means for producing electrical signals representative of the reflectivity characteristic of a surface in the field of view, said sensor means having a normally active fixed light source and a normally deenergized scanning light source, and a light sensor for receiving a portion of the light reflected from the target in the field of view; and b. control means for automatically and periodically energizing the active fixed light source in a first mode of operation, and for detecting when an object is moved into or through said field of view to automatically switch said active fixed light source to a continuous second mode of operation.

47. A system according to claim 46, wherein the fixed light source includes a light emitting diode light source to produce the first light beam.

48. A system according to claim 46, further comprising scanning means which moves the beam from the scanning light source along a first scan path in the reading mode.

49. Apparatus as defined in claim 46, further comprising first timing means for deactivating said light sensor when no object has been introduced into the scan field of view for a predetermined period of time.

50. Apparatus as defined in claim 49, further comprising second timing means for automatically switching said fixed light source during a first mode of operation to an off mode when no object has been placed in said field of view for a predetermined period of time.

51. Apparatus as defined in claim 46, further comprising detection means which functions to process the background signal and the signal produced when an object is placed within the field of view to produce an output signal when such signals differ, and further comprising means responsive to said output signal for switching said fixed light source from a pulsing mode to a continuous mode of operation.

52. Apparatus as defined in claim 51, when said scanning light source is activated in response to said output signal.

53. Apparatus for reading bar code symbols or the like on a target comprising:

a. means for generating a light beam having a variable duty cycle directed towards a target in a field of view, and for receiving reflected light from such target to produce electrical signals corresponding to the reflectivity of the surface of the target; and b. means for changing said duty cycle upon the elapse of a predetermined period of time after a bar code symbol reading operation has been completed to place said means for generating a light beam in a "sleep" mode.

54. Apparatus as defined in claim 53, wherein said variable duty cycle includes pulsing the light beam at a predetermined rate is said sleep mode, and operating in a continuous emission mode.

55. Apparatus as defined in claim 53, further comprising means for processing said electrical signals and detecting if an object is moved into or through said field of view, whereby the duty cycle is changed from said sleep mode to continuous mode of operation in response to the presence of an object in the field of view to enable a bar code symbol on a surface of such object to be read.

56. Apparatus as defined in claim 53, wherein said light beam is pulsed at a first predetermined frequency in a first mode of operation shortly after a bar code reading operation has been completed, and at a second predetermined frequency, smaller than said first predetermined frequency, in said sleep mode of operation after said light beam has remained in said first mode of operation for a predetermined period of time.

57. Apparatus for reading bar code symbols or the like on a target comprising:

a. means for generating a first fixed light beam directed towards a target in a field of view and having an active, an intermediate, and an "off" mode of operation; and b. detector means for receiving reflected light from such target to produce electrical signals corresponding to the reflectivity of the surface of the target;

c. means for processing said electrical signals and determining if an object is moved into or through said field of view; and d. means for generating a scanning second light beam in response to the presence of an object in the field of view to read a bar code symbol on a surface of such object; and e. means for scanning said second light beam across said target.

58. Apparatus as defined in claim 57, wherein said first light beam is pulsed at a first predetermined frequency in said intermediate mode of operation and said means for processing said electric signals produces a background signal when no object is present in the field of view, and said first light beam operates continuously in said active mode of operation.

59. Apparatus as defined in claim 57, wherein said means for generating a scanning second light beam includes a laser diode for generating a light beam and a mirror for deflecting the second light beam in a scanning pattern over a bar code symbol.

60. Apparatus as defined in claim 57, wherein said means for generating a first light beam is operated continuously when the means for generating a scanning light beam is producing a scanning second light beam.

61. Apparatus as defined in claim 57, further comprising timing means for deactivating said means for generating a scanning light beam when no object has been introduced into the scan field of view for a predetermined period of time.

62. Apparatus as defined in claim 57, further comprising a second timing means for automatically switching said first light beam from said first mode of operation to an off mode when no object has been placed in said field of view for a predetermined period of time.

63. Apparatus as defined in claim 58, wherein said means for processing said electrical signals includes means for detecting said background signal and the signal produced when an object is placed within the field of view and for producing an output signal indicative when such signals differ, and processor means responsive to said output signal for switching said first light beam from said first mode to said second mode of operation.

64. Apparatus as defined in claim 63, when said means for generating a scanning second light beam is activated in response to said output signal.

65. In a device for reading bar code symbols or the like having a scanning light beam for scanning the symbol to be read and a sensor for detecting variations in the light reflected from the symbol scanned to generate an electric signal indicative of the symbol, the improvement which comprises a second separate light source for directing a light beam in the general direction of the scanning light beam and for reflection back to the sensor from an object intercepting the same, and control means for actuating said device from an inactive non-reading state to an active reading state upon variations of reflected light from said second separate light source received by said sensor.

66. In a device for reading bar code symbols, or the like, having a scanning light beam for scanning the symbol to be read and a sensor for detecting variations in the light reflected from the symbol being scanned and generating electrical signals indicative of the symbol, the improvement, which comprises control means for activating said device between an inactive nonreading state and an active reading state upon either positive or negative variations in light received by said sensor when in said inactive state.

67. The improvement according to claim 66, in which said control means actuate said device from said inactive to said active state upon positive or negative variations of a predetermined amount of light received by said sensor when in said inactive state.

68. A method for reading bar code symbols or the like on a target comprising the steps of:
   a. generating a first fixed light beam directed towards a target in a field of view, and receiving reflected light from such target to produce electrical signals corresponding to the reflectivity of the surface of the target;
   b. processing said electrical signals and detecting if an object is moved into or through said field of view; and
   c. generating a scanning second light beam in response to the presence of an object in the field of view to read a bar code symbol on a surface of such object.

69. A method as defined in claim 68, further comprising the step of pulsing said first light beam at a first predetermined frequency in a first mode of operation; and said step of processing said electric signals includes the step of producing a background signal when no object is present in the field of view.

70. A method as defined in claim 69, further comprising the step of operating said first light beam continuously in a second mode of operation.

71. A method as defined in claim 68, wherein said step of generating a scanning second light beam includes utilizing a laser diode for generating said second light beam and a mirror for deflecting the second light beam in a scanning pattern over a bar code symbol.

72. A method for reading bar code symbols or the like on a target comprising the steps of:
   a. generating a first light beam pulsed at a first predetermined frequency in a first mode of operation and operated continuously in a second mode of operation, said beam being directed towards a target in a field of view, and for receiving reflected light from such target to produce electrical signals corresponding to the reflectivity of the surface of the target;
   b. processing said electrical signals during said first mode of operation to detect if an object is moved into or through said field of view; and
   c. generating a scanning second light beam to read a bar code symbol on a surface of such object responsive to the presence of an object in the field of view.

73. A method as defined in claim 72, wherein said step of generating a scanning second light beam includes utilizing a laser diode for generating a light beam and a mirror for deflecting the second light beam in a scanning pattern over a bar code symbol.

74. A method as defined in claim 72, wherein said step of generating a first light beam includes operating said first light beam continuously while producing a scanning second light beam.

75. A method as defined in claim 72, further comprising the step of deactivating said scanning light beam when no object has been introduced into the scan field of view after a predetermined period of time.

76. A method as defined in claim 72, further comprising the step of automatically switching said first light beam during a first mode of operation to an off mode when no object has been placed in said field of view for a predetermined period of time.

77. A method as defined in claim 72, wherein said step of processing said electrical signals includes detecting said background signal and the signal produced when an object is placed within the field of view and for producing an output signal indicative when such signals differ, and switching said first light beam from said first mode to said second mode of operation in response to said output signal.

78. A method as defined in claim 77, when said step of generating a scanning second light beam is in response to said output signal.

79. A method for reading bar code symbols or the like on targets, comprising:
   a. generating and directing a first fixed light beam in a pulsing object sensor mode toward a field of view to detect the presence of a target within the field of view, and directing a laser beam in a reading mode to the target for scanning at least one of said light beam and said field of view in a scan pattern across the target; and
   b. receiving light reflected off the target in the object sensor mode and the reading mode to produce electrical signals corresponding to data represented by the target.

80. A method according to claim 79, wherein a light emitting diode light source is utilized to produce the first light beam.

81. A method according to claim 79, further comprising the step of moving the laser beam along a first scan path in the reading mode.

82. A method as defined in claim 79, further comprising the step of deactivating said means for detecting a laser beam when no object has been introduced into the scan field of view for a predetermined period of time.

83. A method as defined in claim 80, further comprising the step of automatically switching said first light beam during a first mode of operation to an off mode when no object has been placed in said field of view for a predetermined period of time.

84. A method as defined in claim 79, further comprising the step of processing the background signal and the signal produced when an object is placed within the field of view to produce an output signal when such signals differ, and switching said first light beam from a pulsing mode to a continuous mode of operation in response to said output signal.

85. A method as defined in claim 84, when said laser beam is activated in response to said output signal.

86. A method for reading bar code symbol or the like comprising the steps of:
   a. producing electrical signals representative of the reflectivity characteristic of a surface in the field of view from sensor means, said sensor having (a) a normally active fixed light source and a normally deenergized scanning light source, and (b) a light sensor for receiving a portion of the light reflected from the target in the field of view; and b. automatically and periodically energizing the active fixed light source in a first mode of operation, and detecting when an object is moved into or through said field of view to automatically switch said active fixed light source to a continuous second mode of operation.

87. A method according to claim 86, wherein the fixed light source includes a light emitting diode light source to produce the first light beam.

88. A method according to claim 86, further comprising the step of scanning the beam from the scanning light source along a first scan path in the reading mode.

89. A method as defined in claim 86, further comprising the step of deactivating said light sensor when no object has been introduced into the scan field of view for a predetermined period of time.

90. A method as defined in claim 89, further comprising the step of automatically switching said fixed light source during a first mode of operation to an off mode when no object has been placed in said field of view for a predetermined period of time.

91. A method as defined in claim 86, further comprising the step of processing the background signal and the signal produced when an object is placed within the field of view to produce an output signal when such signals differ, and further comprising the step of switching said fixed light source from a pulsing mode to a continuous mode of operation.

92. A method as defined in claim 91, further comprising the step of activating the scanning light source in response to said output signal.

* * * * *